United States Patent
Bodz et al.

(10) Patent No.: US 10,318,988 B2
(45) Date of Patent: *Jun. 11, 2019

(54) MANAGING COOKIE DATA

(71) Applicant: INTERNATIONAL BUSINESS MACHINES CORPORATION, Armonk, NY (US)

(72) Inventors: Trevor J. Bodz, Austin, TX (US); Jennifer E. Grucza, Bedford, MA (US); Kathy P. Mitchell, Southlake, TX (US); Dennis D. Osentoski, Highland Village, TX (US); Randall A. Stark, Euless, TX (US); Matthew Whitbourne, Horndean (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,243

(22) Filed: Dec. 3, 2014

(65) Prior Publication Data
US 2015/0236925 A1    Aug. 20, 2015

Related U.S. Application Data

(63) Continuation of application No. 14/182,481, filed on Feb. 18, 2014.

(51) Int. Cl.
*G06Q 30/02* (2012.01)
*H04L 12/24* (2006.01)
*H04L 29/08* (2006.01)

(52) U.S. Cl.
CPC ..... *G06Q 30/0255* (2013.01); *G06Q 30/0269* (2013.01); *H04L 41/50* (2013.01);
(Continued)

(58) Field of Classification Search
CPC ......... G06Q 30/02; H04L 41/50; H04L 67/02; H04L 67/10
See application file for complete search history.

(56) References Cited

U.S. PATENT DOCUMENTS 6,330,556 B1 * 12/2001 Chilimbi ............. G06F 12/0802
6,330,566 B1 * 12/2001 Durham ............ G06F 17/30893
(Continued)

FOREIGN PATENT DOCUMENTS

WO    WO-0075814 A1 * 12/2000    .......... G06F 11/3419

OTHER PUBLICATIONS

Fenstermacher et al., "Mining Client-Side Activity for Personalization" (published in Proceedings Fourth IEEE International Workshop on Advanced Issues of E-Commerce and Web-Based Information Systems on Jan. 1, 2002) (Year: 2002).*

(Continued)

*Primary Examiner* — Chrystina E Zelaskiewicz
*Assistant Examiner* — Patrick Kim
(74) *Attorney, Agent, or Firm* — Law Office of Jim Boice

(57) ABSTRACT

A method, information handling system and/or computer program product provides a cookie to a user. The method comprises: analyzing data in a consolidated set of the user's internet activities; generating a server side cookie for a website based on the analyzed data; in response to the user visiting the website with a first client, providing the server side cookie to the first client; merging the server side cookie with a client side cookie at the first client; and using the merged cookie to provide personalized recommendations to the user.

13 Claims, 10 Drawing Sheets

(52) U.S. Cl.
CPC .............. *H04L 67/02* (2013.01); *H04L 67/10* (2013.01); *H04L 67/1002* (2013.01); *H04L 67/146* (2013.01); *H04L 67/22* (2013.01)

(56) References Cited

U.S. PATENT DOCUMENTS

| | | | |
|---|---|---|---|
| 6,611,814 B1* | 8/2003 | Lee | G06Q 30/02 705/26.1 |
| 7,949,702 B2 | 5/2011 | McGee et al. | |
| 8,805,946 B1* | 8/2014 | Glommen | H04L 67/10 709/206 |
| 2002/0143933 A1* | 10/2002 | Hind | G06Q 30/02 709/224 |
| 2003/0037131 A1 | 2/2003 | Verma et al. | |
| 2006/0004971 A1* | 1/2006 | Kim | G06F 12/0246 711/154 |
| 2006/0136524 A1* | 6/2006 | Wohlers | H04L 67/02 |
| 2006/0174327 A1 | 8/2006 | Song et al. | |
| 2007/0157304 A1 | 7/2007 | Logan et al. | |
| 2009/0083421 A1* | 3/2009 | Glommen | G06F 11/3495 709/224 |
| 2011/0078333 A1 | 3/2011 | Jakubowski | |
| 2013/0218953 A1* | 8/2013 | Bombacino | H04L 67/42 709/203 |
| 2014/0282025 A1* | 9/2014 | Fan | G06F 17/3089 715/736 |
| 2015/0106198 A1* | 4/2015 | Miller | G06Q 30/0255 705/14.52 |

OTHER PUBLICATIONS

P. Mell et al., "The NIST Definition of Cloud Computing", National Institute of Standards and Technology, Information Technology Laboratory, Version 15, October 7, 2009, pp. 1-2.

* cited by examiner

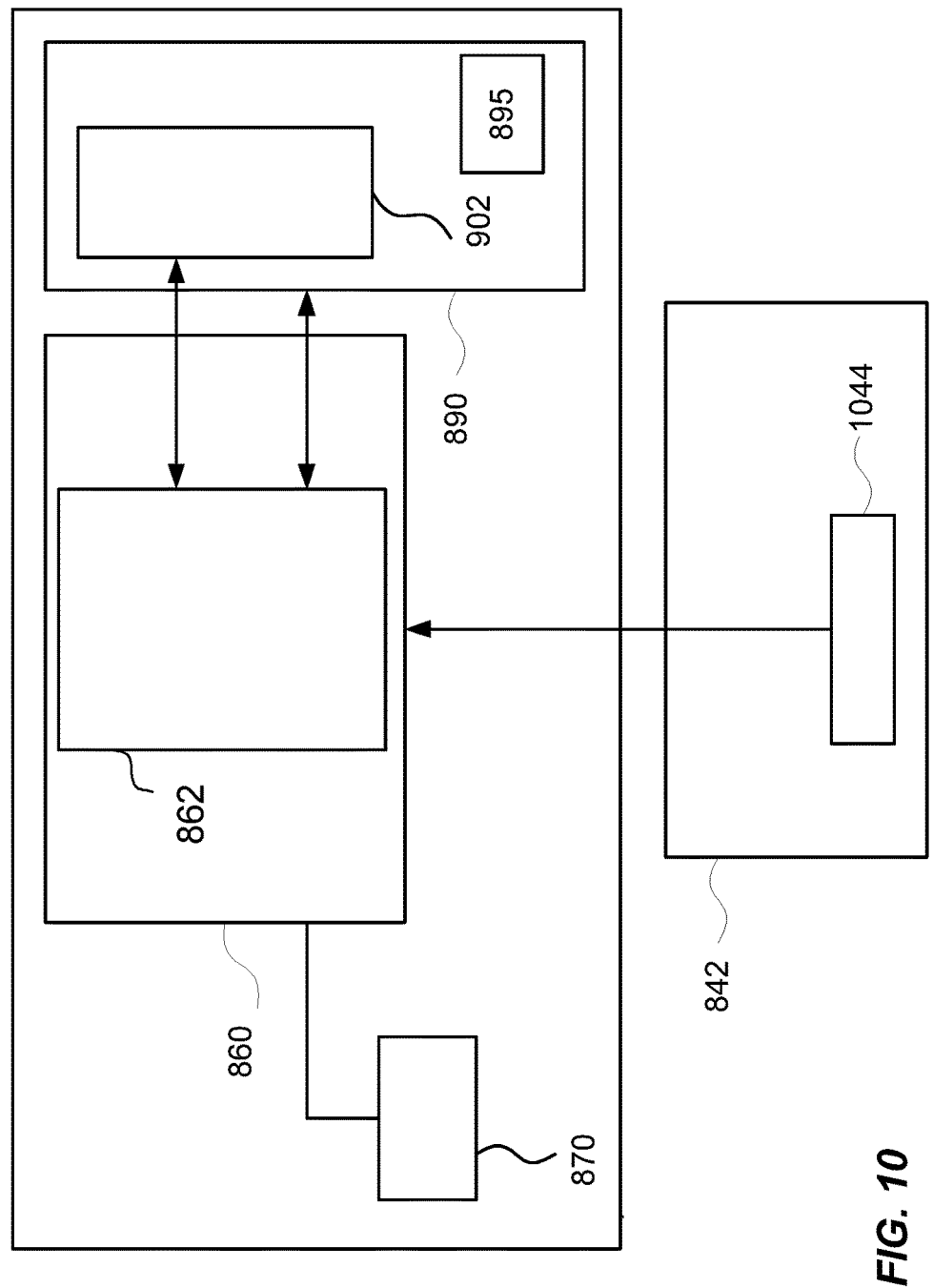

US 10,318,988 B2

MANAGING COOKIE DATA

BACKGROUND

The invention is generally directed to providing online services. In particular it provides a method and apparatus suitable for providing a cookie to a customer and providing online services based on that cookie.

Product recommendation engines provide personalized recommendations as part of an electronic commerce (eCommerce) solution to improve sales revenue and product attachment for clients. These engines operate in an environment outside of the eCommerce trading engine, which means that data is commonly collected using a system of website tagging, with access to transactional data not something readily accessible. However, with a proliferation of multiple browsers and devices used by consumers it is progressively difficult to provide accurate recommendations using all available data using such a transactional third party analytical approach without access to individual customer data from master data sources.

Currently in most recommendation frameworks, the historical view, cart, and purchase activity of an individual user on a specific machine/device is stored in a local cookie on that user's same machine with a cookie identification (id) unique to that machine/device. Cookies are commonly used to help personalize recommendations served on retail websites by using information based on what the user last viewed, carted, or purchased. However, without correlating together the browsing history across browsers operating on multiple devices and browsers the recommendation engine has an incomplete picture of recent history, meaning that the most accurate recommendations cannot be served. Cookie data is also stored locally for performance reasons, for example, so that the server need not be repeatedly queried for the same information.

Prior art solutions provide the synchronization of cookies, but with a user opting into devices, with the synchronization provided by a cookie exchange server. Other solutions require browser plugins to provide the necessary aggregation.

SUMMARY

In one embodiment of the present invention, a method provides a cookie to a user by: analyzing, by one or more processors, data in a consolidated set of the user's internet activities; generating, by one or more processors, a server side cookie for a website based on the analyzed data; in response to the user visiting the website with a first client, providing, by one or more processors, the server side cookie to the first client; merging, by one or more processors, the server side cookie with a client side cookie at the first client; and using the merged cookie to provide personalized recommendations to the user.

In one embodiment of the present invention, an information handling system comprises: one or more processors; a memory coupled to at least one of the processors; a set of instructions stored in the memory and executed by at least one of the processors for providing a cookie to a user, wherein the set of instructions perform actions of: analyzing data in a consolidated set of the user's internet activities; generating a server side cookie for a website based on the analyzed data; in response to the user visiting the website with a first client, providing the server side cookie to the first client; merging the server side cookie with a client side cookie at the first client; and using the merged cookie to provide personalized recommendations to the user.

In one embodiment of the present invention, a computer program product provides a cookie to a user, the computer program product comprising a computer readable storage medium having program instructions embodied therewith, the program instructions executable by a computer to cause the computer to: analyze data in a consolidated set of the user's internet activities; generating a server side cookie for a website based on the analyzed data; in response to the user visiting the website with a first client, provide the server side cookie to the first client; merge the server side cookie with a client side cookie at the first client; and use the merged cookie to provide personalized recommendations to the user.

BRIEF DESCRIPTION OF THE SEVERAL VIEWS OF THE DRAWINGS

The present invention will now be described, by way of example only, with reference to preferred embodiments, as illustrated in the following figures:

FIG. 10 depicts further interactions between the components, in accordance with a preferred embodiment of the present invention.

Figure 1:
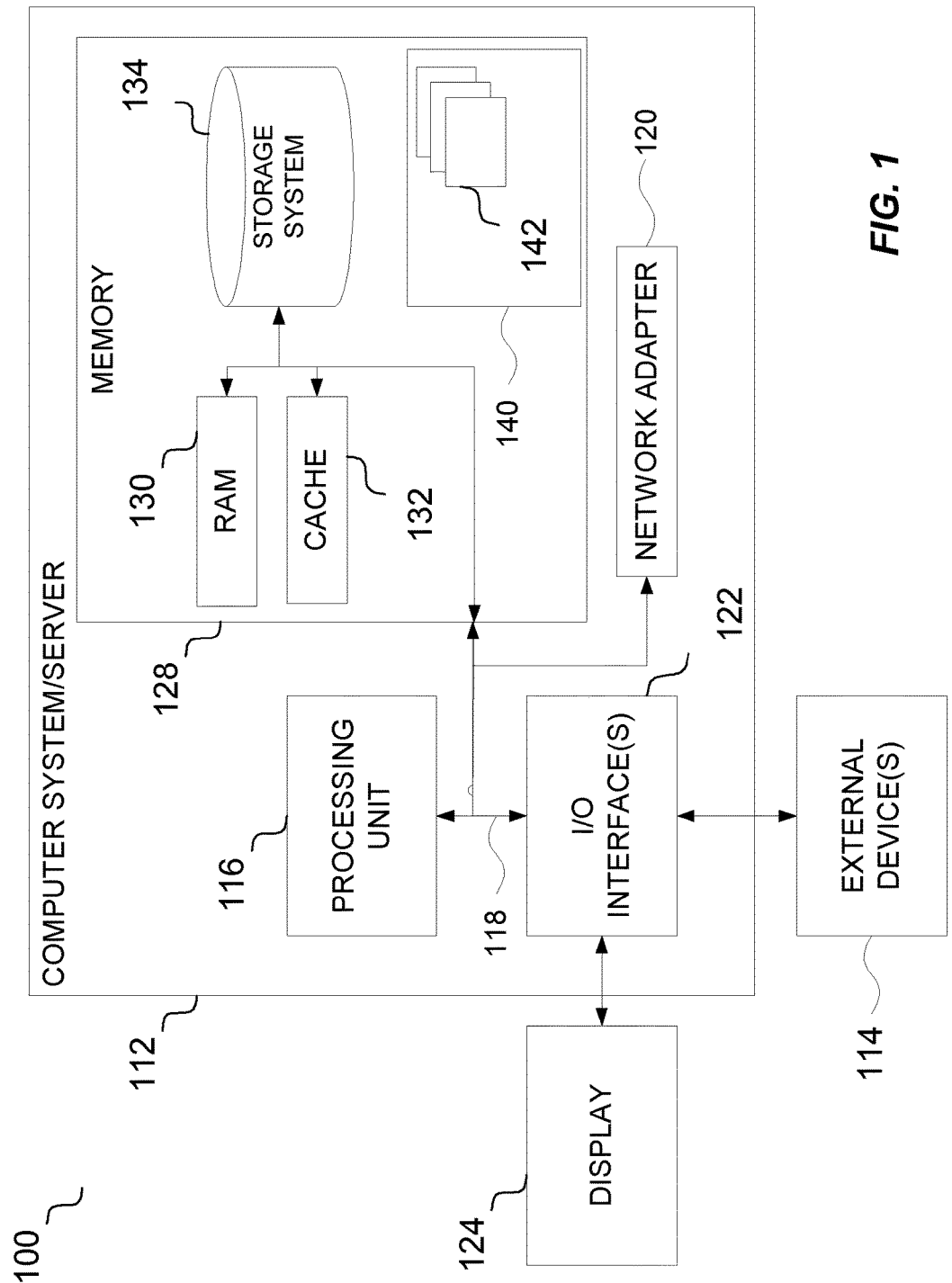
FIG. 1 depicts a schematic of a cloud computing node, in accordance with the prior art, and in which a preferred embodiment of the present invention may be implemented.

Figure reference numbers used in more than one figure relate to the same functional component of the present invention.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
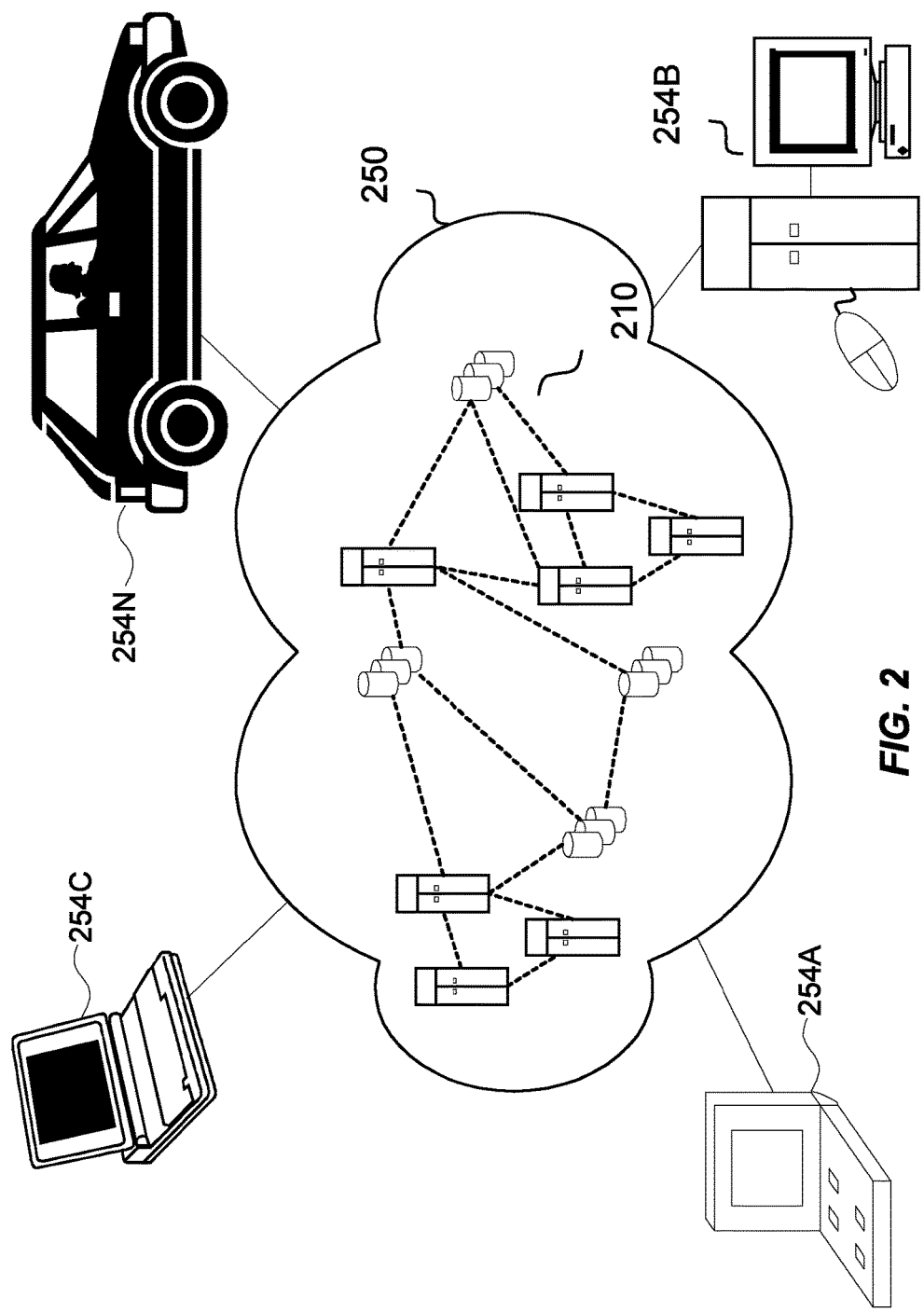
FIG. 2 depicts a cloud computing environment, in accordance with the prior art, and in which a preferred embodiment of the present invention may be implemented.

Referring now to FIG. 2, illustrative cloud computing environment 250 is depicted. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
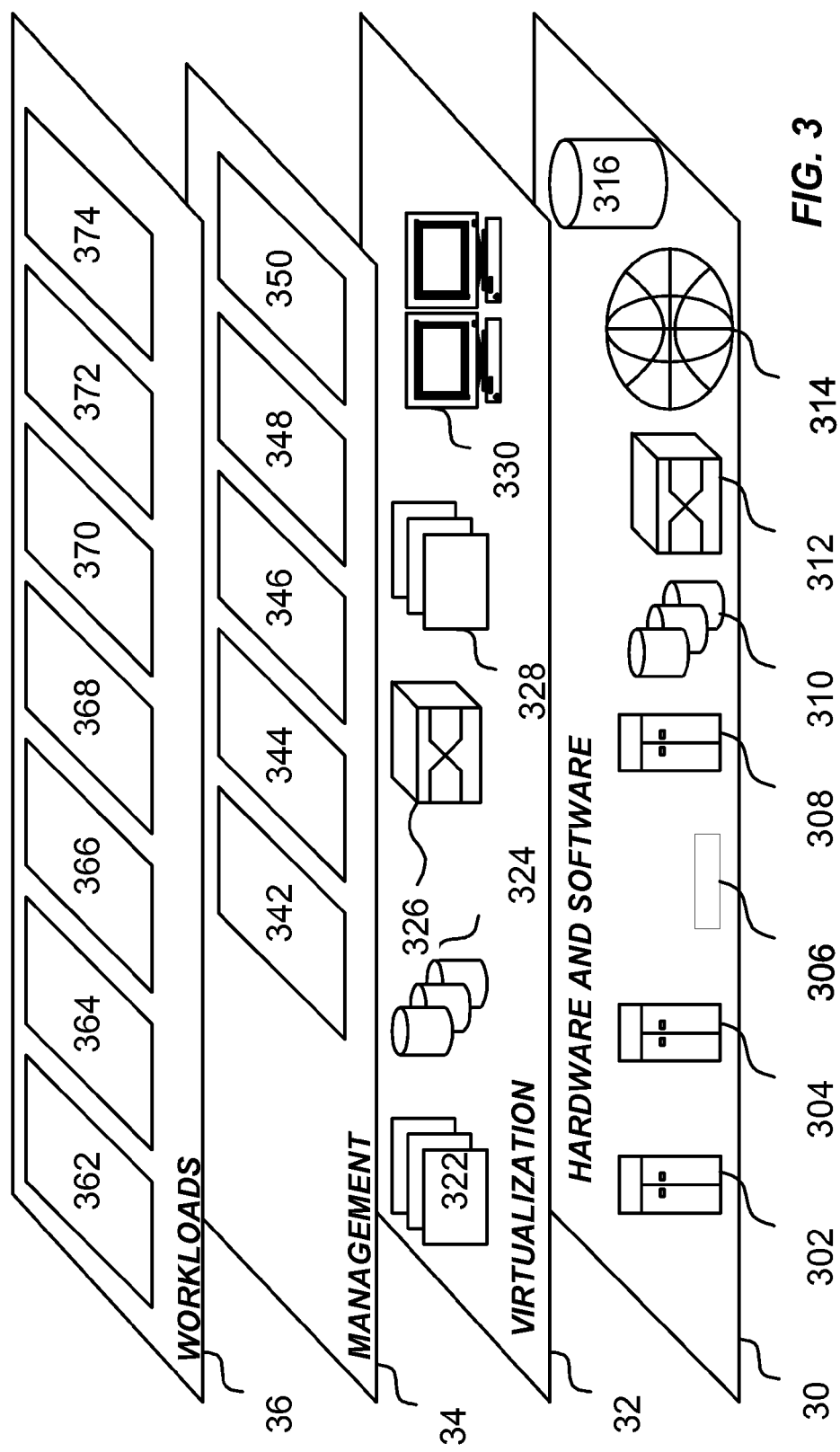
FIG. 3 depicts an abstraction model provided by a cloud computing environment of FIG. 2, in accordance with the prior art, and in which a preferred embodiment of the present invention may be implemented.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 30 includes hardware and software components. Examples of hardware components include mainframes 302, in one example IBM® Z-SERIES® systems; RISC (Reduced Instruction Set Computer) architecture based servers 304, in one example IBM P-SERIES® systems; IBM X-SERIES® systems 306; IBM BLADECENTER® systems 308; storage devices 310; networks and networking components 312. Examples of software components include network application server software 314, in one example IBM WEBSPHERE® application server software; and database software, in one example IBM DB2® database software 316.

Virtualization layer 32 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 34 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfilment 350 provide pre-arrangement for, and procurement of, cloud computing resources for which a future requirement is anticipated in accordance with an SLA.

Workloads layer 36 provides examples of functionality for which the cloud computing environment may be utilized. Examples of workloads and functions which may be provided from this layer include: mapping and navigation 362;

software development and lifecycle management 364; virtual classroom education delivery 366; data analytics processing 368; transaction processing 370; recommendation processing 372; and analytics processing 374.

Figure 4:
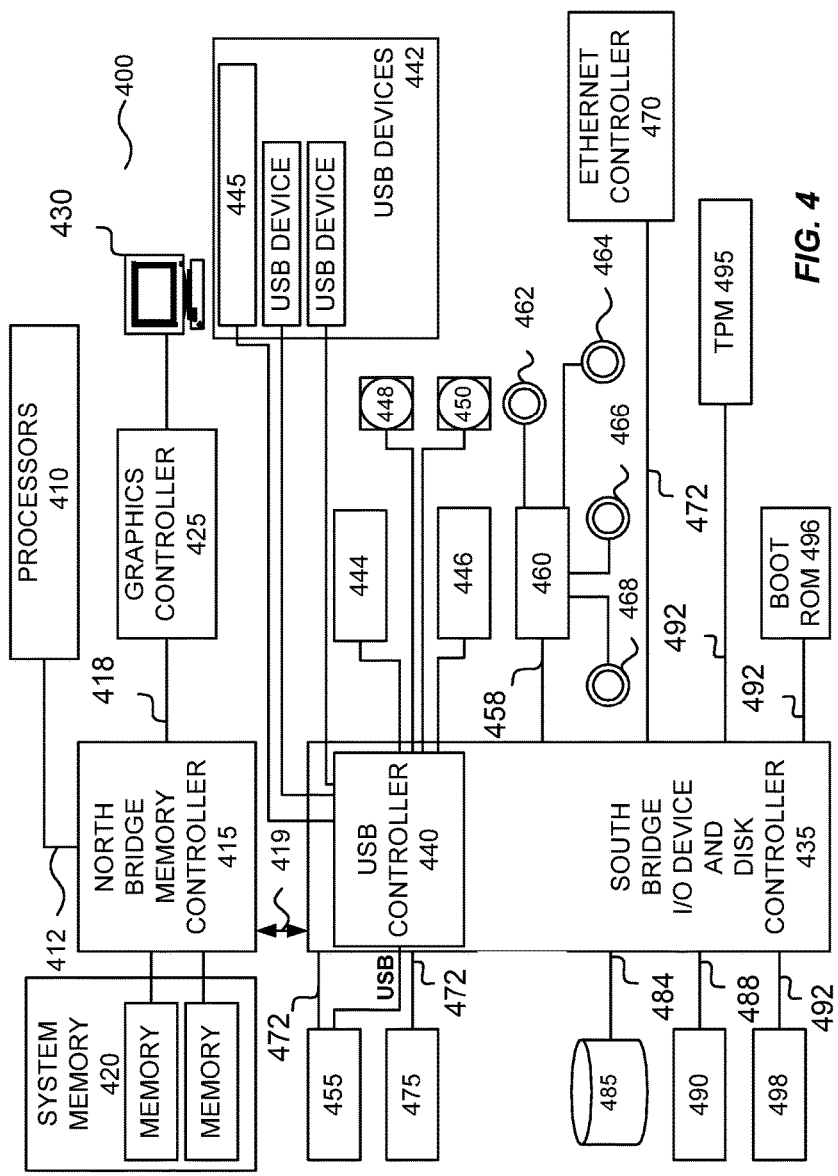
FIG. 4 is a block diagram depicting an information handling system, in accordance with the prior art, and in which a preferred embodiment of the present invention may be implemented.

FIG. 4 illustrates an information handling system 400, which is a simplified example of a computer system capable of performing the computing operations described herein. Information handling system 400 includes one or more processors 410 coupled to processor interface bus 412. Processor interface bus 412 connects processors 410 to Northbridge 415, which is also known as the Memory Controller Hub (MCH). Northbridge 415 connects to system memory 420 and provides a means for processor(s) 410 to access the system memory. Graphics controller 425 also connects to Northbridge 415. In one embodiment, PCI Express bus 418 connects Northbridge 415 to graphics controller 425. Graphics controller 425 connects to display device 430, such as a computer monitor.

Northbridge 415 and Southbridge 435 connect to each other using bus 419. In one embodiment, the bus is a Direct Media Interface (DMI) bus that transfers data at high speeds in each direction between Northbridge 415 and Southbridge 435. In another embodiment, a Peripheral Component Interconnect (PCI) bus connects the Northbridge and the Southbridge. Southbridge 435, also known as the I/O Controller Hub (ICH) is a chip that generally implements capabilities that operate at slower speeds than the capabilities provided by the Northbridge. Southbridge 435 typically provides various busses used to connect various components. These busses include, for example, PCI and PCI Express busses, an ISA bus, a System Management Bus (SMBus or SMB), and/or a Low Pin Count (LPC) bus 492. The LPC bus often connects low-bandwidth devices, such as boot ROM 496 and "legacy" I/O devices (using a "super I/O" chip). The "legacy" I/O devices 498 can include, for example, serial and parallel ports, keyboard, mouse, and/or a floppy disk controller. The LPC bus also connects Southbridge 435 to Trusted Platform Module (TPM) 495. Other components often included in Southbridge 435 include a Direct Memory Access (DMA) controller, a Programmable Interrupt Controller (PIC), and a storage device controller, which connects Southbridge 435 to nonvolatile storage device 485, such as a hard disk drive, using bus 484.

ExpressCard 455 is a slot that connects hot-pluggable devices to the information handling system. ExpressCard 455 supports both PCI Express and USB connectivity as it connects to Southbridge 435 using both the Universal Serial Bus (USB) the PCI Express bus. Southbridge 435 includes USB Controller 440 that provides USB connectivity to devices that connect to the USB. These devices include webcam (camera) 450, infrared (IR) receiver 448, keyboard and trackpad 444, and Bluetooth device 446, which provides for wireless personal area networks (PANs). USB Controller 440 also provides USB connectivity to other miscellaneous USB connected devices 442, such as a mouse, removable nonvolatile storage device 445, modems, network cards, ISDN connectors, fax, printers, USB hubs, and many other types of USB connected devices. While removable nonvolatile storage device 445 is shown as a USB-connected device, removable nonvolatile storage device 445 could be connected using a different interface, such as a Firewire interface, etcetera.

Wireless Local Area Network (LAN) device 475 connects to Southbridge 435 via the PCI or PCI Express bus 472. LAN device 475 typically implements one of the IEEE 802.11 standards of over-the-air modulation techniques that all use the same protocol to wireless communicate between information handling system 400 and another computer system or device. Optical storage device 490 connects to Southbridge 435 using Serial ATA (SATA) bus 488. Serial ATA adapters and devices communicate over a high-speed serial link. The Serial ATA bus also connects Southbridge 435 to other forms of storage devices, such as hard disk drives. Audio circuitry 460, such as a sound card, connects to Southbridge 435 via bus 458. Audio circuitry 460 also provides functionality such as audio line-in and optical digital audio in port 462, optical digital output and headphone jack 464, internal speakers 466, and internal microphone 468. Ethernet controller 470 connects to Southbridge 435 using a bus, such as the PCI or PCI Express bus. Ethernet controller 470 connects information handling system 400 to a computer network, such as a Local Area Network (LAN), the Internet, and other public and private computer networks.

While FIG. 4 shows one information handling system 400, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 495) shown in FIG. 4 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 4.

Figure 5:
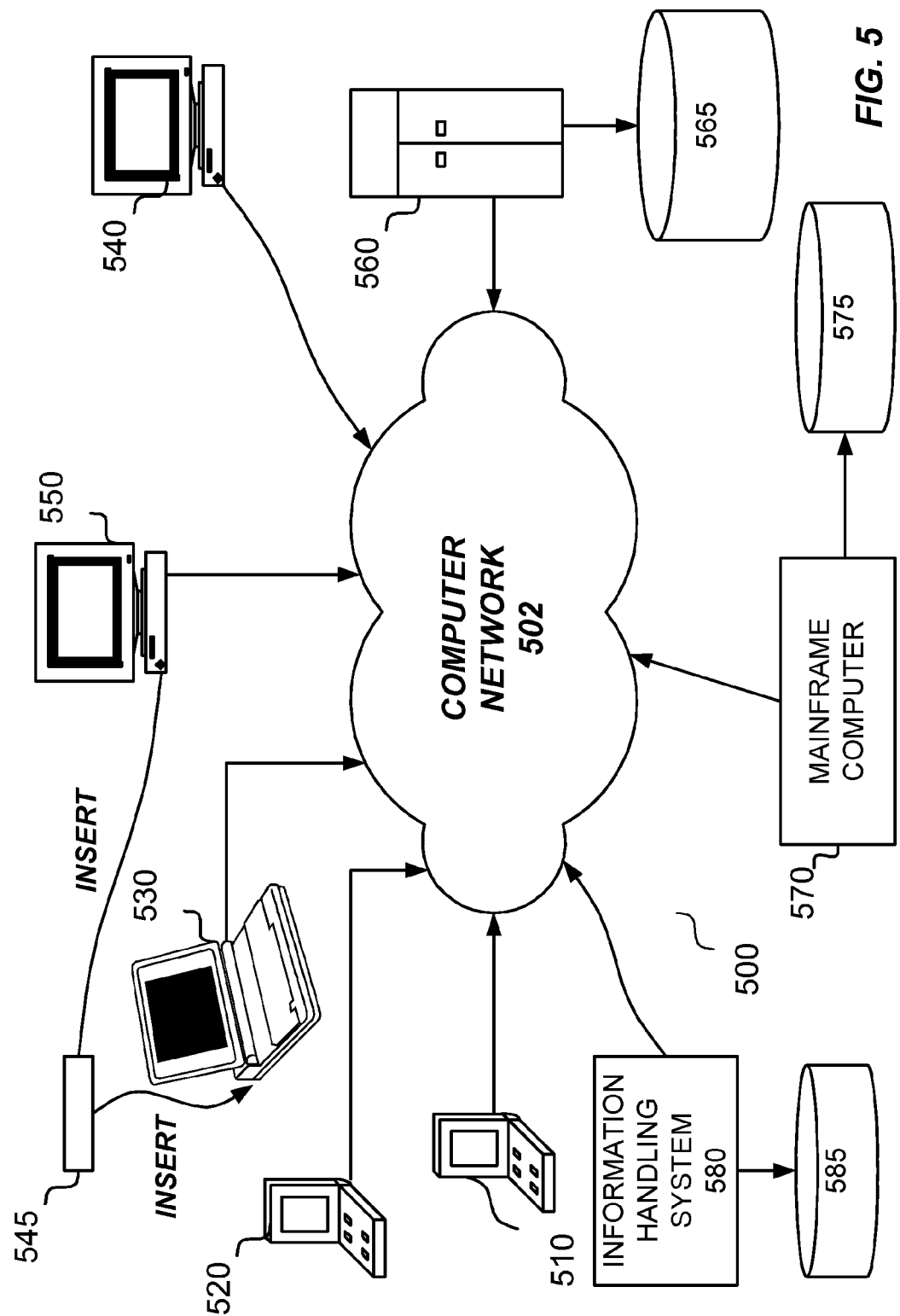
FIG. 5 depicts an extension of the information handling system of FIG. 4, in accordance with the prior art, and in which a preferred embodiment of the present invention may be implemented.

FIG. 5 provides an extension of the information handling system 400 environment shown in FIG. 4 to illustrate that the methods described herein can be performed on a wide variety of information handling systems 400 that operate in a networked environment 500. Types of information handling systems 400 range from small handheld devices, such as handheld computer/mobile telephone 510 to large mainframe systems, such as mainframe computer 570. Examples of handheld computer 510 include personal digital assistants (PDAs), personal entertainment devices, such as MP3 players, portable televisions, and compact disc players. Other examples of information handling systems include pen, or tablet, computer 520, laptop, or notebook, computer 530, workstation 540, personal computer system 550, and server 560. Other types of information handling systems that are not individually shown in FIG. 5 are represented by information handling system 580. As shown, the various information handling systems can be networked together using computer network 502. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 5 depicts separate nonvolatile data stores (server 560 utilizes nonvolatile data store 565, mainframe computer 570 utilizes nonvolatile data store 575, and information handling system 580 utilizes nonvolatile data store 585). The nonvolatile data store can be a component that is external to the various information handling systems or can be internal to one of the information handling systems. In addition, removable nonvolatile storage device 545 can be shared among two or more information handling systems using various techniques, such as connecting the removable nonvolatile storage device 545 to a USB port or other connector of the information handling systems.

Figure 6:
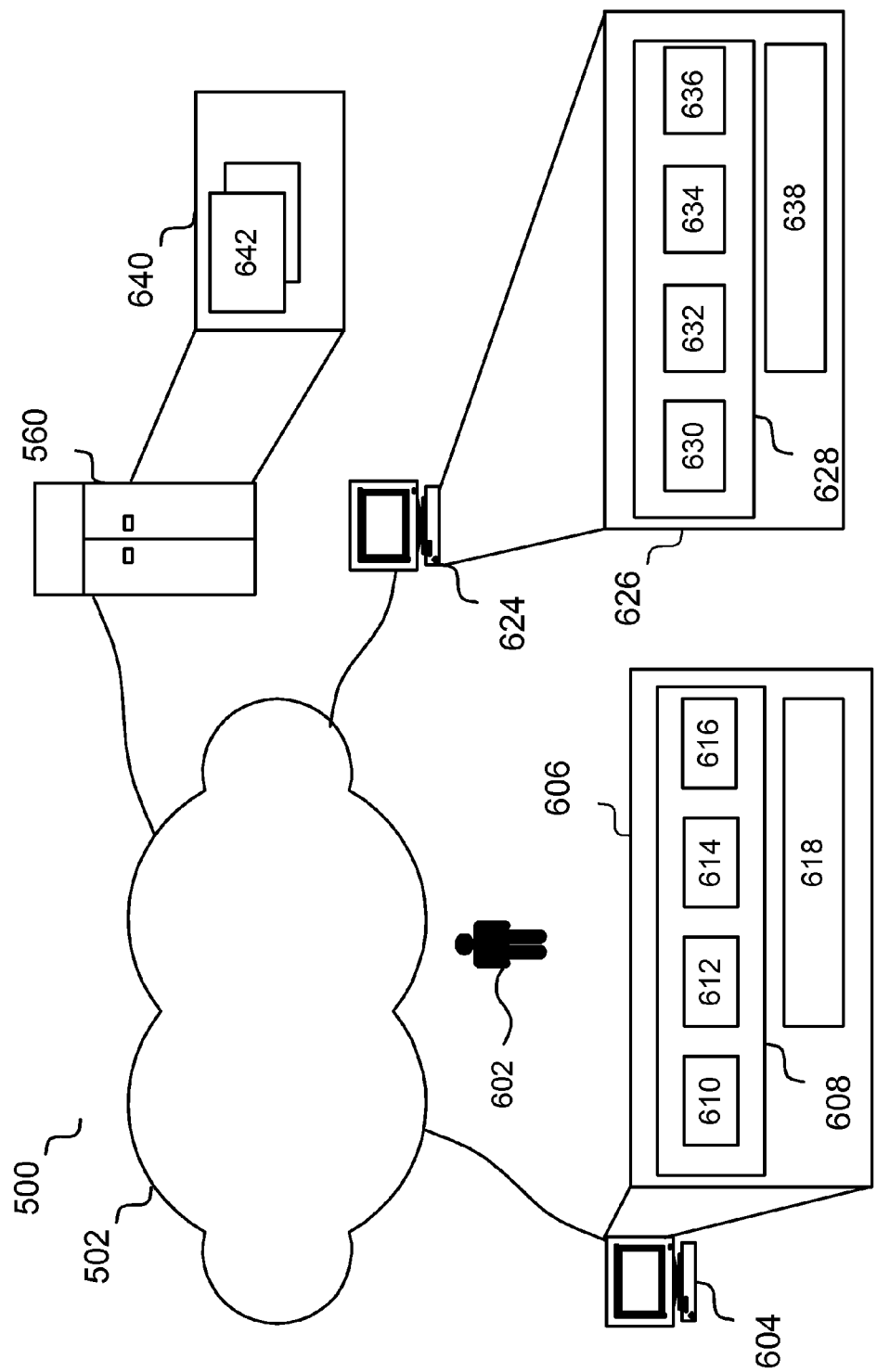
FIG. 6 depicts another view of the environment of FIG. 5, in accordance with the prior art, and in which a preferred embodiment of the present invention may be implemented.

FIG. 6 depicts another view of the environment 500 of FIG. 5. A user 602 uses a first information handling system 400, such as a first computer terminal 604 or a second computer terminal 624. The first 604 and second 624 computer terminals are also known as client computers 604, 624. The user 602 uses an internet browser, also known as a web browser, 606, 626 to access a remote resource 642 available on a server 560. Typical remote resources 642 include a webpage 642, or a set of webpages 642 on a website 640, but could take other forms. Such remote resources 642 can be identified or addressed using various addressing methods, such as by uniform resource locator (URL), by Internet Protocol (IP) address, or other such methods. For purposes of illustration only, the remote resource 642 will be described as a webpage 642 in preferred embodiments of the present invention. The skilled person will also understand that server 560 could be a single physical server 560, or could be a logical server 560 made up of multiple physical servers 560.

When the user 602 use the web browser 606, 626 to access the webpage 642, webpage code is downloaded to the client computer 604, 624. The webpage code can comprise, but is not restricted to, HyperText Markup Language (HTML), Cascading Style Sheets (CSS), and JavaScript. The web browser 606, 626 interprets the webpage code 642 and displays the webpage 618, 638 on the client computer 604, 624. The webpage code can also provide and install a local cookie 608, 628. Also known, for example, as an HTTP cookie 608, 628, web cookie 608, 628, or browser cookie 608, 628, a local cookie 608, 628 is a data component that is stored in the web browser 606, 626. There are a number of types of local cookie 608, 628, for example: a "session" cookie 608, 628 can be resident only during the browsing of the webpage 642; a "persistent" cookie 608, 628 may remain in the storage 134, ROM or memory 128 of the client computer until cleared at a later time; a "tracking" cookie can monitor general browsing activity of a user 602 across multiple webpages 642; an "authentication" cookies can be used to see whether the user 602 is logged into the webpage 642, and whether the user 602 is authorized to do so. Using a local cookie 608, 628 allows a set of accesses to a webpage 642, or to a set of related webpages 642, to be connected with each other, without the server considering the accesses to be a set of unrelated accesses.

Whenever the webpage 642 is loaded, the web browser 606, 626 sends a copy of the local cookie 608, 628 to the server 560 with information about the user's 602 client computer 604, 624 activity. Examples of activity are logging in, selecting items to buy on-line, adding to a shopping cart, and buying the selected items. Records of the activity can be stored within the local cookie 608, 628, for example, in historical views 610, 630; contents of shopping carts 612, 632; and purchase activity 614, 634. Other fields 616, 636 can also store further activity. A shopping cart in this context is a virtual component in which the user 602 can store selected items that the user 602 may want to purchase.

Currently, the historical view 610, cart 612, and purchase activity 614 of the user 602 on a specific client computer 604, 624 is stored in the local cookie 608 on that user's same client computer 604, 624. A cookie has an identification (id) that is unique to that client computer 604, 624. Prior art solutions (not shown) use installed JAVASCRIPT® on the client computer 604, 624 to help personalize recommendation requests based on what the user 602 last viewed, carted, or purchased from that specific client computer 604, 624.

Figure 7:
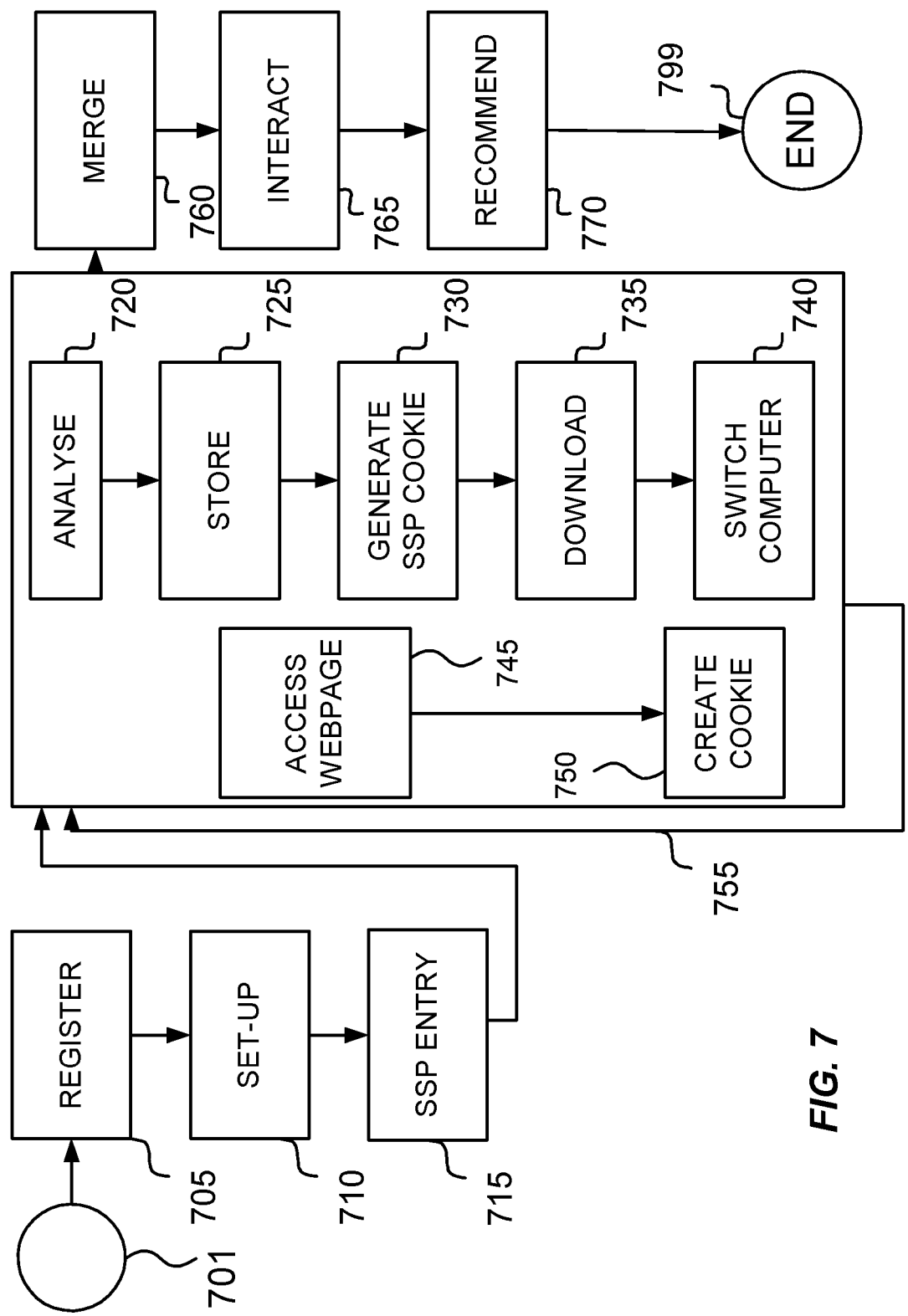
FIG. 7 depicts a flow diagram depicting a method of a preferred embodiment of the present invention.
Figure 8:
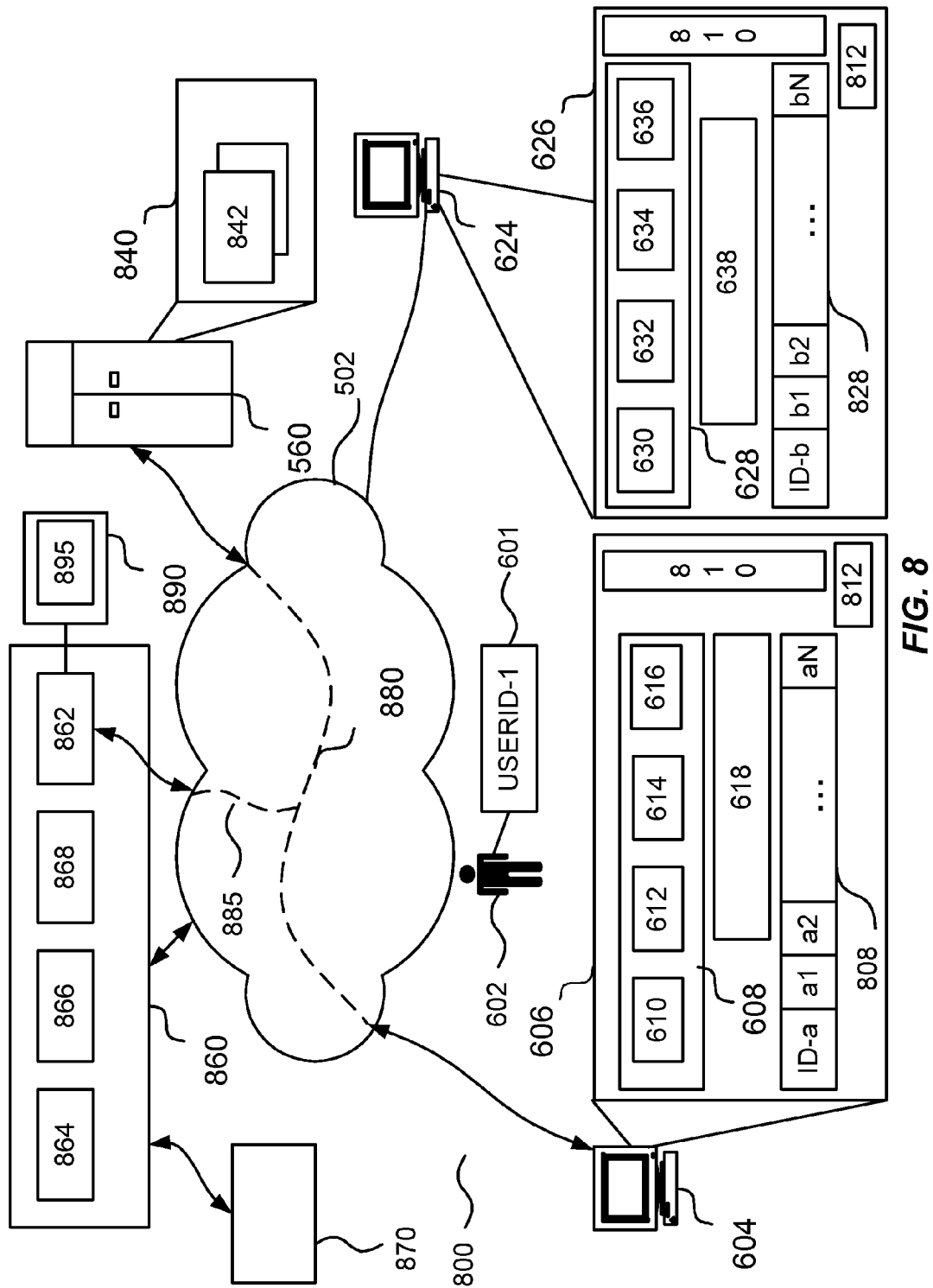
FIG. 8 depicts another view of the environment of FIG. 5, according to a preferred embodiment of the present invention.
Figure 9:
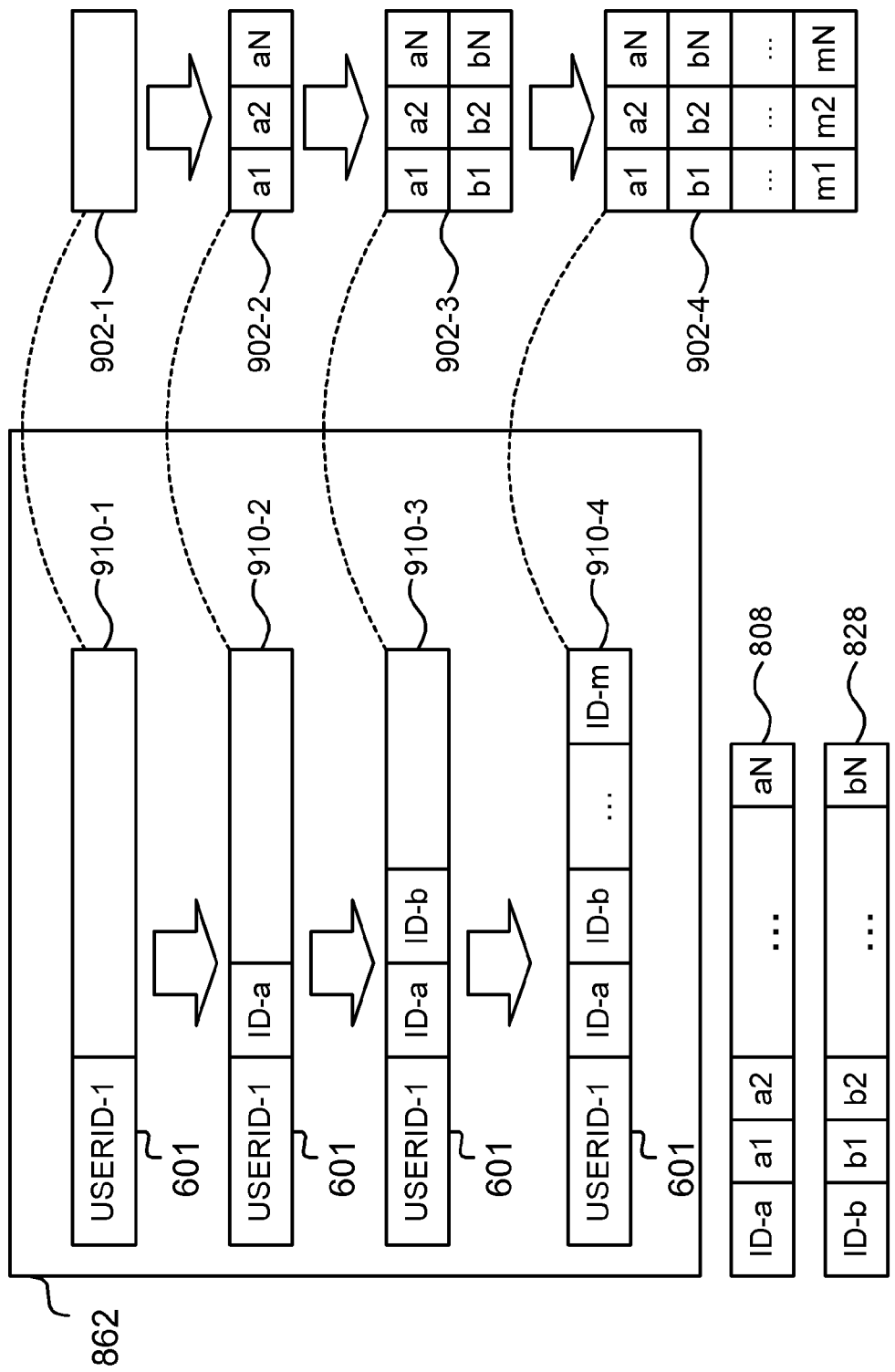
FIG. 9 depicts data structures used, in accordance with a preferred embodiment of the present invention.

FIG. 7, which should be read in conjunction with FIGS. 8, 9 and 10, depicts a flow diagram depicting a method of an embodiment of the present invention.

FIG. 8 depicts another view 800 of the environment 500 of FIG. 5, according to a preferred embodiment of the present invention.

FIG. 9 depicts data structures used, in accordance with a preferred embodiment of the present invention.

FIG. 10 depicts further interactions between the components, in accordance with a preferred embodiment of the present invention.

The user 602 uses the web browser, 606, 626 to access a remote resource 842, or a set of webpages 842 on a website 840, served by the server 560. Access is made through a first logical connection 880. A recommendation component 860 is operable within the environment 800. The recommendation component 860 may be used for the recommendation processing 372 in a cloud computing environment 250 as described with reference to FIG. 3.

An example of a recommendation component 860 is IBM® Enterprise Marketing Management (EMM) Product Recommendation Solution 860. The recommendation component 860 is a set of computer application programs that provide personal product recommendations 870 to users 602. Typical product recommendations 870 are product advertisements presented to the user 602 through the web browser 606, 626. However, the product recommendations 870 may also be presented to the user 602 through other routes, for example, through email, web, mobile, display ad, point-of-sale devices and social media. The recommendation component 860 comprises a number of further components, such as: an analytics component 862, an offering component 864, a display component 866, and an email component 868.

An example of the analytics component 862 is the IBM® Digital Analytics, or IBM® COREMETRICS® Web Analytics. The analytics component 862 is operable to analyze the interactions between the client computer 604, 624 made by the user 602, and websites 840 available. The analytics component 860 analyses the interactions by analyzing a consolidated set of the user's internet activities. The analysis can be performed by accessing the first logical connection 880 through a second logical connection 885. The analytics component 862 provides analyses from analytics and comparative benchmarks, leveraging coded tags 812, such as IBM® COREMETRICS® Web Analytics tags and third party integrations, to drive product recommendations. The analytics component 862 can also interact with external analytics engines (not shown). The analytics component 860 could be used for analytics processing 374 in a cloud component environment 250.

An example of an offering component 864 is IBM® PRODUCT RECOMMENDATIONS 864 for personalized product recommendations including web, mobile, email, display ad, and social media. An example of the display advertising component 866 is IBM® ADTARGET 866 for including personalized product recommendations in targeted display advertisement campaigns. An example of the email component 868 is IBM® LIVEMAIL 868 for including personalized product recommendations in your targeted email campaigns.

The actual delivery of the personal product recommendation can be made through a server 875, such as a content delivery network (CDN) 875 available to the network 502. The CDN 875 may be a separate 3rd party server, or may be part of the recommendation component 860 software and any associated server cluster that the recommendation component 860 is operable on. The recommendation component 860 can direct the CDN 875 to provide the information immediately, or the CDN 875 can cache information associated with the user 602 along with the personalized product recommendation at a later date.

When the user 602 operates the web browser 606, 626 to access the webpage 842, webpage code is downloaded to the client computer 604, 624. The webpage code comprises JavaScript code 810. The webpage code also comprises script tags 812. The script tags provide code that sends browsing history, also known as "click-stream" behavior, to the server 560 to collect details of user 602 activity.

The method starts at step 701. In a preferred embodiment of the present in invention, at step 705, the user 602 registers with a webpage 842 enabled for the present invention, or with the recommendation component 860. The user 602 is assigned a user identification (userid) 601. At step 710, the analytics component 862 sets up an analytics entry 910 for the user 602. Referring to FIG. 9, entry 910-1 represents an initial state of the analytics entry 910. At step 715, a server-side personalization (SSP) entry 902 is set up in the database 890. SSP entry 902-1 represents an initial state of the SSP entry 902. In an alternative embodiment, user registration occurs after analysis data has already be gathered. In one embodiment, registration can occur when a user 602 browses a webpage 842 and completes a registration task, for example, by logging in or buying a product. Completing the registration task identifies the user 602, allowing correlation with the cookies available to the analytics components, which have already been made available from other devices.

At step 720 the analytics component 862 starts analyzing a consolidated set of the user's internet activities. The consolidated set of the user's internet activities are the interactions and activities that the user 602 makes with the website 840. This analysis can be made continuously, and therefore in real-time. At step 725 analytics data 895 created from the analysis is stored in the database 890. At step 730, an analytics cookie 808, 828 is created based on the analytics data 895 stored in the database 890. The analytics cookie 808, 828 can be built from discrete actions made by the user 602, for example the purchase of an item. The analytic cookie 808, 828 could also be built from greater than first order information, for example, from the rate of internet accesses. The analytics entry 910-2 is updated with a reference to the analytic cookie ID-a 808. Entries a1, a2 . . . aN are copied into the corresponding SSP entry 902-2 in the database 890. When the user 602 registers with a website 840, the registration event allows the analytics component 862 to map the analytics cookie id ID-a, ID-b on the client computer 604, 624 where the registration event occurred to that user's registration id. Initially this is a "one-cookie-id" to "one-registration-id" mapping. In this embodiment local cookie 608 information, as provided by prior art cookies, is merged with SSP cookie 808, information. The SSP cookie 808 information provides enhanced information arising out of the analysis made on the userid interactions between the first client computer 608 and the server 560.

The analysis 720 can be triggered by tags 812 within the webpage code. When the webpage 842 is loaded the tags are executed, resulting in API calls being made to the analytics component 862, which captures the click stream of the internet activities for the user 602. At this point local cookie 608, 628 data can be synced with SSP cookie 808, 828 information.

At step 735, the analytics cookie 808, 828 is downloaded from the analytics component 862 to the client computer 604 being used by the user 602. FIG. 8 depicts analytic cookies 808, 828 downloaded to the client computers 604, 624, but could have been depicted prior to download from the analytics component 862. At optional step 740, the user 602 switches to client computer 624. Ongoing updates are applied to the client computer 624 with updates to webpage cookie 628.

In parallel with steps 720-740, at step 745, the user 602 is accessing a particular webpage 842 or website 840. At step 750, webpage cookies 608, 628 are created and downloaded to the specific client computer 604, 624 that the user 602 is using for website 842 access. At step 755, the user 602 continues to access the internet so analytics cookies 808, 828, and local cookies 608, 628 continue to be generated, updated and stored. Analytics entry 910-3 depicts an update to analytics entry 910 on switching client computer to 624, updated with a reference to the analytic cookie ID-b 828. Entries b1, b2 . . . bN are copied into the corresponding SSP entry 902-3 in the database 880. Analytics entry 910-4 depicts an update to analytics entry 910 on switching to a further client computer (not shown), updated with a reference to the analytic cookie ID-m (not shown). Entries m1, m2 . . . mN are copied into the corresponding SSP entry 902-4 in the database 880. Optionally, if the user subsequently registers using the additional machine/device (which has its own unique cookie ids), the registration event allows the analytics component 862 to map the analytics cookie id ID-b on the client computer 624 where the registration event occurred to that user's registration id. The additional analytics cookie id 828 will also become associated with that same registration id. The mapping is now a "multiple-cookie-id" to "one-registration-id" mapping. In this optional embodiment local cookie 628 information, as provided by prior art cookies, is merged with SSP cookie 808, 828, information. The SSP cookie 808, 828 information provides enhanced information arising out of the analysis made on the userid interactions between the first and the second client computers 608, 628 and the server 560.

The SSP cookie 808, 828 can be generated on a regular basis. For example, a time period, such as, but not limited to, every 24 hours, could be used using the analytics data 895 containing a consolidated view of a customer's recent commerce activities.

Analytics entry 910, corresponding to SSP entry 902 represent all activities a1, a2 . . . aN, b1, b2 . . . bN, m1, m2 . . . mN for user 602.

When the user 602 returns to a website 840, the cookie contents 608, 628 represent the latest information relating to the client computer 604, 624 that is being used. However the contents of the SSP entry 902 may be different, if there has been activity associated with the user 602 from another device. At step 760, contents of the SSP entry 902 are downloaded from the analytics component 862. This information is merged/merged with that of the local cookie 608, 628 locally stored on the client computer 604, 624 to provide a new personalized cookie (not shown) containing the latest purchasing information across all client computers 604, 624 used by the user 602, for example, devices 510, 520, 530, 540, 550.

At step 765, webpage code 810, which has been downloaded from the webpage 842 to the client computer 604, 624, is executed and makes an application programming interface (API) call 1044 to the recommendation component 860. The call 1044 includes the merged information from step 765. At step 770, the recommendation component 860 processes the call. According to policies and rules, personal product recommendations 870 are provided to the client computer 604, 624 through the CDN 875. There are many policies and rules that could be considered: an example of a rule is to provide personal product recommendations 870 based on items previously included in a cart for the user 602; another example may be to provide personal product recommendations 870 based on items previously browsed by the user 602.

The method ends at step 799.

In an alternative embodiment the SSP cookie 808, 828, SSP entry 902 and analytics entry 910 are created/updated via a batch job that examines the following data and remains static until the next batch cycle regenerates the data: for example, cookie based product views, cookie based carted products, and registration based purchased products.

In an alternative embodiment the only cookie-based data that can be related to a registration id is analyzed and stored in the SSP entry 902. All selected data will be combined by the registration id and a configured limit of the most recent data of each type (view, cart, and purchase) along with a maximum retention days will limit the data stored for a registration id. Logical partitioning by day will be used to manage the registration id based data tables used to create the final SSP cookie 808, 828 by user. The combined data is formatted as a compact cookie which reduces the size of the data, thus further improving performance.

In an alternative embodiment, timestamps are used to ensure the proper sequence of data is maintained when using the SSP entry 902 data to build the SSP cookie 808, 828 and when augmenting the local cookie 608, 628 with the SSP cookie 808, 828 data.

In an alternative embodiment, when the recommendation component 860 API code 1044 makes a request for the SSP cookie 808, 828 data, the API code 1044 passes the registration USER-id 601 and local cookie 608, 628 information as part of the request to the recommendation component 860. A process on the recommendation component 860 retrieves the user's SSP entry 902 from the database 890 and merges the results with the local cookie 608, 628 information to create a new updated cookie which is used within the recommendation component 860. In doing this the recommendation component 860 code footprint is small, reducing any processing overhead delays and minimizing latency. This process only needs to be executed once per user session.

Additionally, if the synchronization process takes too long the JAVASCRIPT 810 code will timeout this request and will default to the local cookie.

The merged cookie data can benefit the creation of recommendations for a specific user in the following ways. The most recent purchase for this visitor may have occurred under a different related cookie. In this case, the merged cookie will contain this product id as the Last Product Purchased. The most recent carted product for this visitor may have occurred under a different related cookie. In this case, the merged cookie will contain this product id as the Last Carted Product. The most recently viewed product for this visitor may have occurred under a different related cookie. In this case, the merged cookie will contain this product id as the most Recently Viewed Product. The chronological list of the most recently viewed products may contain one or more product views that occurred under a different related cookie(s). In this case, the merged cookie will contain an updated chronological list of the recently viewed products. The latest highest value purchase for this visitor may have occurred under a different related cookie. In this case, the merged cookie will contain this product id as the most Significant Purchase. The skilled person would appreciate that the personalized recommendation could relate to multiple products, or combinations, for example, of viewed, carted and purchased products. Only cookie-based data that can be related to a registration id will be analyzed and stored in the SSP entries 902. All selected data will be combined by the registration id USERID-1 601 and a configured limit of the most recent data of each type (view, cart, and purchase) along with a maximum retention days will limit the data stored for a registration id. Logical partitioning by day will be used to manage the registration id based data tables used to create the final SSP entries 902 by user.

Timestamps will be used to ensure that the proper sequence of data is maintained when using the analytics data to build the SSP entries 902 and when augmenting the local cookie 608, 628 with the SSP entry data.

All SSP cookies 808, 828 may be written to a file in a format similar to that of the local cookie 608, 628 where it is then uploaded to the recommendation component 860 by encrypted registration id. When the JAVASCRIPT 810 makes a request for the SSP entry 902 data, the JAVASCRIPT 810 passes the encrypted registration id and local cookie 608, 628 information as part of the request to the recommendation component 860. A process on the recommendation component 860 will then attempt to retrieve the user's SSP entry 902 from the recommendation component 860 and merge the results with the local cookie 608, 628 to create a new updated cookie which it returns to the JAVASCRIPT 810. This keeps the JAVASCRIPT t 810 logic to a minimum regarding the enhancement of the local cookie 608, 628 data.

As described herein and viewed from as first aspect, the present invention provides a method for providing a cookie to a user, comprising: analyzing data in a consolidated set of the user's internet activities; generating a server side cookie for a website based on the analyzed data; in response to the user visiting the website with a first client, providing the server side cookie to the first client; merging the server side cookie with a client side cookie at the first client; and using the merged cookie to provide personalized recommendations to the user.

Preferably, the present invention provides a method, wherein using the merged cookie at the client to provide personalized recommendations to the user further comprises: sending merged data within the merged cookie to a recommendation component; and in response to the recommendation component receiving the merged data, analyzing the merged data to provide the personalized recommendations.

Preferably, the present invention provides a method, wherein analyzing the merged data to provide the personalized recommendations further comprises applying a set of rules to the analyzed merged data to provide the personalized recommendations.

Preferably, the present invention provides a method, wherein the user's internet activities comprise internet activities from the first client and a second client. Preferably, the present invention provides a method, wherein the method is provided by software as a service in a cloud environment. Preferably, the present invention provides a method, further comprising generating the server side cookie based on a time interval.

Viewed from a further aspect, the present invention provides an information handling system comprising: one or more processors; a memory coupled to at least one of the processors; a set of instructions stored in the memory and executed by at least one of the processors for providing a cookie to a user, wherein the set of instructions perform actions of: analyzing data in a consolidated set of the user's internet activities; generating a server side cookie for a website based on the analyzed data; in response to the user visiting the website with a first client, providing the server side cookie to the first client; merging the server side cookie with a client side cookie at the first client; and using the merged cookie to provide personalized recommendations to the user.

Preferably, the present invention provides a system, wherein using the merged cookie at the client to provide personalized recommendations to the user further comprises sending merged data within the merged cookie to a recommendation component; and in response to the recommendation component receiving the merged data, analyzing the merged data to provide the personalized recommendations.

Preferably, the present invention provides a system, wherein analyzing the merged data to provide the personalized recommendations further comprises applying a set of rules to the analyzed merged data to provide the personalized recommendations.

Preferably, the present invention provides a system, wherein the user's internet activities comprise internet activities from the first client and a second client.

Preferably, the present invention provides a system, wherein the set of instructions perform actions provided by software as a service in a cloud environment.

Preferably, the present invention provides a system, further comprising generating the server side cookie based on a time interval.

Viewed from a further aspect, the present invention provides a computer program product for providing a cookie to a user, the computer program product comprising a computer readable storage medium having program instructions embodied therewith, the program instructions executable by a computer to cause the computer to: analyze data in a consolidated set of the user's internet activities; generating a server side cookie for a website based on the analyzed data; in response to the user visiting the website with a first client, provide the server side cookie to the first client; merge the server side cookie with a client side cookie at the first client; and use the merged cookie to provide personalized recommendations to the user.

Preferably, the present invention provides a computer program product, the program instructions further executable by a computer to cause the computer to: use the merged cookie at the client to provide personalized recommendations to the user by sending merged data within the merged cookie to a recommendation component; and in response to the recommendation component receiving the merged data, analyze the merged data to provide the personalized recommendations.

Preferably, the present invention provides a computer program product, the program instructions further executable by a computer to cause the computer to analyze the merged data to provide the personalized recommendations by applying a set of rules to the analyzed merged data to provide the personalized recommendations.

Preferably, the present invention provides a computer program product, wherein the user's internet activities comprise internet activities from the first client and a second client. Preferably, the present invention provides a computer program product, wherein the program instructions executable by a computer are provided by software as a service in a cloud environment. Preferably, the present invention provides a computer program product, the program instructions further executable by a computer to generate the server side cookie based on a time interval.

Advantageously, this invention provides a novel solution to this problem available and marketed in the IBM® Product Recommendations offering, with advantages over other alternative techniques in providing a balanced approach to both information accuracy and performance.

Advantageously, the present invention provides personalized product recommendations based on each customer's current and historical shopping interests, trends and business rules to present customers with the most relevant, effective and timely recommendation possible for wherever they are in the buying journey and process.

Advantageously, the present invention provides dynamic personalized product recommendations across channels and routes, for example, through email, web, mobile, display ad, point-of-sale devices and social media. It generates product recommendations automatically based on a customer's unique attributes, past purchases, current and historical shopping behaviors, and business rules. Therefore, merchandisers and eCommerce marketers can up-sell and cross-sell merchandise by targeting customers with relevant, effective and timely recommendations across their buying journey.

Advantageously, personal recommendations can be made for individual customers, maximizing conversions by delivering contextual, behavior-based product recommendations based on customer interests and actions. An engaging customer experience can be created, with the customer conversation continuing, thus increasing lift and loyalty by providing compelling product recommendations across channels. Business insights can be improved to increase performance, with the analytics and reporting used to gain deeper insight into recommendations strategy and customer behavior. Merchandising and marketing objectives can be met, optimizing the recommendation strategy, aligned with the business goals.

Advantageously, embodiments of the present invention provide a different approach in that the cookie data is effectively built from analytics data directly, which has the added advantage that should cookie from each device be deleted it can still be restored from this generated cookie as soon as the visitor conducts a registration event which identifies them to the Recommendation/Analytics system.

Referring to the figures, and including but not limited to FIG. 4, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

IBM, Z-SERIES, P-SERIES, X-SERIES, BLADECENTER, WEBSPHERE, DB2, and COREMETRICS are trademarks of International Business Machines Corporation registered in many jurisdictions worldwide.

What is claimed is:

1. A method for providing a cookie to a user, the method comprising:
assigning, by one or more processors, a user identification to a user;
identifying, by the one or more processors, a consolidated set of internet activities by the user, wherein the internet activities are identified by the user identification;
analyzing, by the one or more processors, data in the consolidated set of internet activities by the user, wherein said data comprises a description of interactions with a website by the user from multiple client devices, wherein said analyzing is triggered by tags, within webpage code for the website, being sent to a current client device currently in use by the user, and wherein executing the tags results in an application program interface (API) call to an analytics component that captures a click stream of internet activities by the user using the multiple client devices;

generating, by the one or more processors, a server side cookie for the website based on the analyzed data, wherein the server side cookie is an analytics cookie that provides a real-time analysis of the internet activities by the user using the multiple client devices, wherein the analytic s cookie is periodically updated to describe a rate of internet accesses by the user, and wherein the server side cookie is generated in a cloud of computing resources;

in response to the user visiting the website with a first client device, transmitting, by the one or more processors, the server side cookie from the cloud of computing resources to the first client device;

initiating a merging, by the one or more processors, of the server side cookie with a client side cookie at the first client device to create a merged cookie, wherein the client side cookie includes a session-based tracking cookie that monitors browsing activity of the user during a browsing of the website and an authentication cookie that authorizes the user to access the website while using the first client device, and wherein the merged cookie is a compact cookie that is smaller than a sum of the server side cookie plus the client side cookie;

determining, by the one or more processors, that the merging of the server side cookie with the client side cookie at the first client device takes longer than a predefined length of time, wherein a timer starts at a beginning of the merging in order to determine how long the merging is taking; and in response to determining that the merging of the server side cookie with the client side cookie at the first client device takes longer than the predefined length of time, ceasing, by the one or more processors, the merging and defaulting to the client side cookie in the first client device.

2. The method of claim 1, further comprising:
completing, by the one or more processors, the merging of the server side cookie with the client side cookie to create the merged cookie, wherein the first client device continues to utilize the client side cookie that is defaulted to for use by the first client device;
sending, by the one or more processors, merged data within the merged cookie to a recommendation component; and
in response to the recommendation component receiving the merged data, analyzing, by the one or more processors, the merged data to provide personalized recommendations to the user.

3. The method of claim 2, wherein analyzing the merged data to provide the personalized recommendations further comprises applying a set of rules to the analyzed merged data to provide the personalized recommendations.

4. The method of claim 1, wherein the consolidated set of Internet activities by the user comprise Internet activities from the first client device and a second client device.

5. The method of claim 1, wherein the method is implemented by a hardware service in a cloud environment.

6. The method of claim 1, further comprising:
generating, by the one or more processors, new server side cookies at a predetermined time interval.

7. The method of claim 1, wherein the client side cookie describes product views taken by the user, products placed in an electronic shopping cart by the user, and products purchased by the user.

8. The method of claim 2, further comprising:
transmitting, by the one or more processors, the personalized recommendations to the user as a message that is presented to the user from a point-of-sale device.

9. The method of claim 1, further comprising:
initiating merging, by the one or more processors, of the server side cookie with the client side cookie only once per user session.

10. The method of claim 1, further comprising:
completing, by the one or more processors, the merging of the server side cookie with the client side cookie to create the merged cookie, wherein the first client device continues to utilize the client side cookie that is defaulted to for use by the first client device;
detecting, by the one or more processors, that the client side cookie has been deleted from the first client device;
in response to detecting that the client side cookie has been deleted from the first client device, removing, by the one or more processors, the server side cookie from the merged cookie to create a reconstructed client side cookie; and
reloading, by the one or more processors, the reconstructed client side cookie onto the first client device.

11. The method of claim 1, further comprising:
completing, by the one or more processors, the merging of the server side cookie with the client side cookie to create the merged cookie, wherein the first client device continues to utilize the client side cookie that is defaulted to for use by the first client device;
detecting, by the one or more processors, that the first client device has returned to the website after leaving the website;
detecting, by the one or more processors, that the server side cookie changed after the first client device left the website, wherein the changed server side cookie resulted from the user using a second client device; and
in response to detecting the changed server side cookie, merging, by the one or more processors, the changed server side cookie with the client side cookie to create a new merged cookie in the first client computer.

12. The method of claim 1, further comprising:
completing, by the one or more processors, the merging of the server side cookie with the client side cookie to create the merged cookie, wherein the first client device continues to utilize the client side cookie that is defaulted to for use by the first client device;
creating, by the one or more processors, a server-side personalization (SSP) entry in a database, wherein the SSP entry contains only activity entries found in the server side cookie;
merging, by the one or more processors, the SSP entry with the client side cookie to create a new updated merged cookie;
utilizing, by the one or more processors, the new updated merged cookie by a server to generate a new personalized recommendation to the user, wherein utilization of the SSP entry reduces processing overhead delays and minimizes latency due to a reduced code footprint of the new updated merged cookie.

13. A method for providing a cookie to a user, the method comprising:

assigning, by the one or more processors, a user identification to a user;

identifying, by the one or more processors, a consolidated set of internet activities by the user, wherein the internet activities are identified by the user identification;

analyzing, by the one or more processors, data in the consolidated set of internet activities by the user, wherein said data comprises a description of interactions with a website by the user from multiple client devices, wherein said analyzing is triggered by tags, within webpage code for the website, being sent to a current client device currently in use by the user, and wherein executing the tags results in an application program interface (API) call to an analytics component that captures a click stream of internet activities by the user using the multiple client devices;

generating, by the one or more processors, a server side cookie for the website based on the analyzed data, wherein the server side cookie is an analytics cookie that provides a real-time analysis of the internet activities by the user using the multiple client devices, wherein the analytic s cookie is periodically updated to describe a rate of internet accesses by the user, and wherein the server side cookie is generated in a cloud of computing resources;

in response to the user visiting the website with a first client device, transmitting, by the one or more processors, the server side cookie from the cloud of computing resources to the first client device;

initiating a merging, by the one or more processors, of the server side cookie with a client side cookie at the first client device to create a merged cookie, wherein the client side cookie includes a session-based tracking cookie that monitors browsing activity of the user during a browsing of the website and an authentication cookie that authorizes the user to access the website while using the first client device, and wherein the merged cookie is a compact cookie that is smaller than a sum of the server side cookie plus the client side cookie;

determining, by the one or more processors, that the merging of the server side cookie with the client side cookie at the first client device takes less than a predefined length of time, wherein a timer starts at a beginning of the merging in order to determine how long the merging is taking;

in response to determining that the merging of the server side cookie with the client side cookie at the first client device takes less than the predefined length of time, completing the merging of the server side cookie with the client side cookie and using the merged cookie in the first client device.

* * * * *